(12) United States Patent
Sisk et al.

(10) Patent No.: US 8,996,227 B2
(45) Date of Patent: Mar. 31, 2015

(54) SYSTEM AND METHOD FOR CONTROLLING VOLTAGE ON A POWER NETWORK

(71) Applicant: Johnson Controls Technology Company, Holland, MI (US)

(72) Inventors: Brian C. Sisk, Mequon, WI (US); Qi Zhang, Milwaukee, WI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 14/014,009

(22) Filed: Aug. 29, 2013

(65) Prior Publication Data

US 2014/0200755 A1     Jul. 17, 2014

Related U.S. Application Data

(60) Provisional application No. 61/751,419, filed on Jan. 11, 2013, provisional application No. 61/800,270, filed on Mar. 15, 2013.

(51) Int. Cl.
| | |
|---|---|
| *B60L 11/12* | (2006.01) |
| *B60W 20/00* | (2006.01) |
| *B60L 11/18* | (2006.01) |
| *B60L 15/20* | (2006.01) |

(Continued)

(52) U.S. Cl.
CPC .......... *B60W 20/106* (2013.01); *B60W 20/1062* (2013.01); *B60L 11/12* (2013.01); *B60L 11/1812* (2013.01); *B60L 11/1868* (2013.01); *B60L 15/2045* (2013.01); *B60L 7/10* (2013.01); *B60L 7/16* (2013.01); *B60L 2260/44* (2013.01); *B60L 2260/50* (2013.01)
USPC ............................ 701/26; 701/31.4; 701/22

(58) Field of Classification Search
None
See application file for complete search history.

(56) References Cited

U.S. PATENT DOCUMENTS

| | | | |
|---|---|---|---|
| 4,663,539 | A | 5/1987 | Sharp et al. |
| 6,054,844 | A | 4/2000 | Frank |
| 7,231,280 | B2 | 6/2007 | Costa |

(Continued)

FOREIGN PATENT DOCUMENTS

EP      2428388 A1      3/2012

OTHER PUBLICATIONS

Fang, et al. "Optimal Control of Parallel Hybrid Electric Vehicles Based on Theory of Switched System", Asian Journal of Control, vol. 8, No. 3, pp. 274-280, Sep. 2006.

(Continued)

*Primary Examiner* — John R Olszewski
*Assistant Examiner* — Jess Whittington
(74) *Attorney, Agent, or Firm* — Fletcher Yoder, P.C.

(57) ABSTRACT

A power control system for controlling a power network of a hybrid electrical vehicle, is provided. The power control system includes a power generating unit, one or more energy storage units coupled to a power converting unit, an electrical load. The power control system further includes a control logic module for controlling the power generating unit and the power converting unit. The control logic module is configured to identify a power demand from the electrical load and to select the power generating unit or one of the one or more energy storage units to control a voltage level of the power network based on the identified power demand, based on electrical characteristics of the power generating unit, of the power converting unit, and of the electrical load, and based on a current mode of operation of the vehicle.

25 Claims, 10 Drawing Sheets

(51) Int. Cl.
  *B60L 7/10*   (2006.01)
  *B60L 7/16*   (2006.01)

(56) References Cited

U.S. PATENT DOCUMENTS

| | | | |
|---|---|---|---|
| 7,573,151 | B2 | 8/2009 | Acena et al. |
| 8,442,727 | B2 | 5/2013 | Yamamoto et al. |
| 2004/0074682 | A1* | 4/2004 | Fussey et al. ............ 180/65.2 |
| 2009/0096285 | A1* | 4/2009 | Acena et al. ............ 307/10.1 |
| 2010/0312430 | A1* | 12/2010 | Troncoso et al. ............ 701/29 |
| 2011/0014533 | A1 | 1/2011 | Jennings |
| 2011/0100735 | A1* | 5/2011 | Flett ............ 180/65.22 |
| 2011/0169448 | A1* | 7/2011 | Ichikawa ............ 320/109 |
| 2011/0202216 | A1* | 8/2011 | Thai-Tang et al. ............ 701/22 |
| 2012/0109617 | A1* | 5/2012 | Minarcin et al. ............ 703/14 |
| 2012/0139329 | A1* | 6/2012 | Fabini et al. ............ 303/3 |
| 2012/0150378 | A1* | 6/2012 | Maini et al. ............ 701/22 |
| 2012/0200257 | A1* | 8/2012 | Schwarz et al. ............ 320/109 |

OTHER PUBLICATIONS

Ko, et al. "Power Control Algorithm for a High Mobility Hybrid Electric Vehicle". http://www.fisita.com/education/congress/sc10/fisita2010sco03.pdf ; 2010.

Sciarretta, et al. "Optimal Control of Parallel Hybrid Electric Vehicles", IEEE Transactions on Control Systems Technology, vol. 12, No. 3, May 2004.

International Search Report and Written Opinion issued for International Application No. PCT/US2013/07170 mailed Oct. 9, 2014.

\* cited by examiner

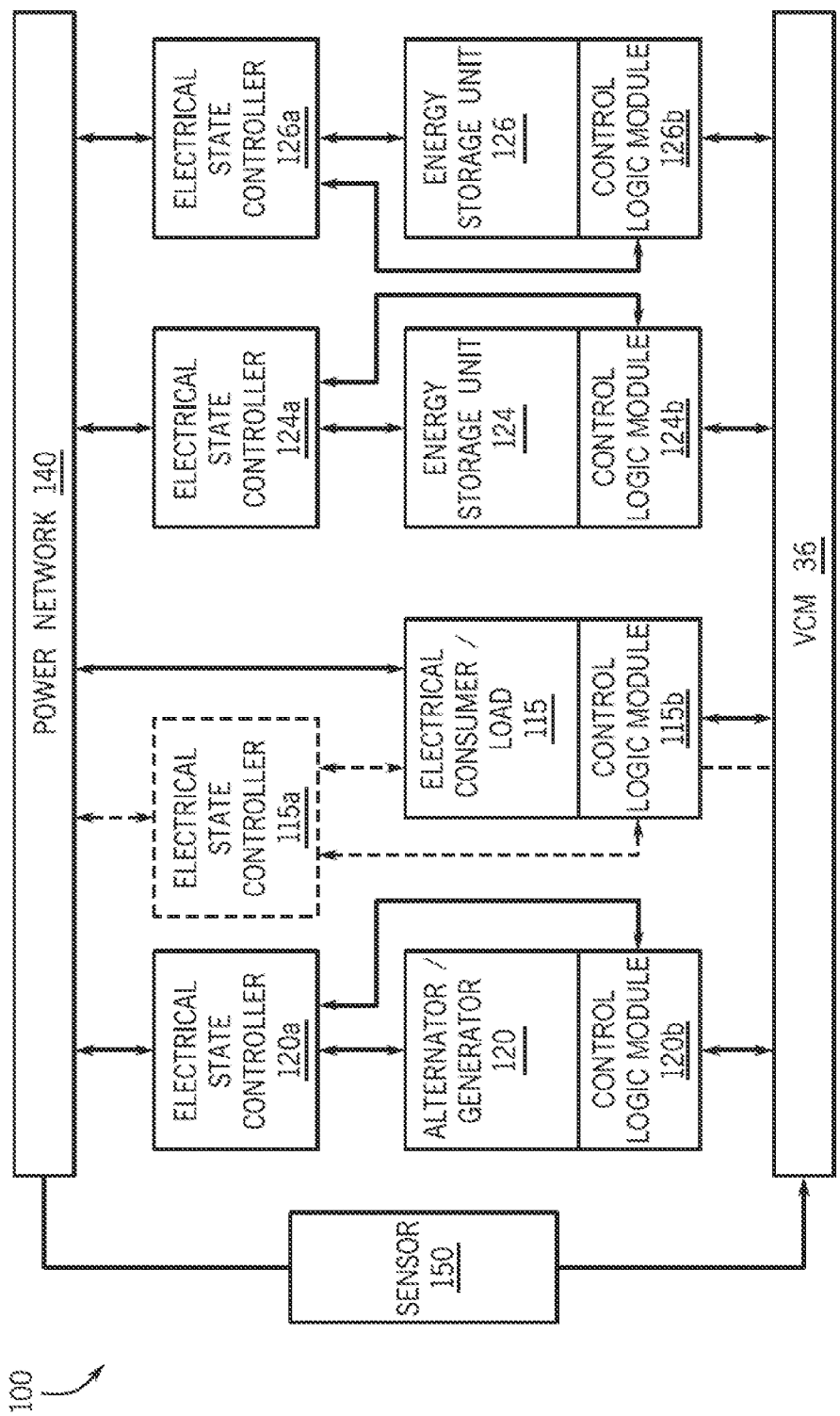

SYSTEM AND METHOD FOR CONTROLLING VOLTAGE ON A POWER NETWORK

CROSS-REFERENCE TO RELATED APPLICATIONS

The present application claims priority under 35 U.S.C. §119(e) to U.S. Provisional Patent Application Ser. No. 61/751,419 filed Jan. 11, 2013, and to U.S. Provisional Patent Application Ser. No. 61/800,270 filed Mar. 15, 2013, which are incorporated herein by reference in their entirety.

BACKGROUND

The present disclosure relates generally to the field of batteries and battery modules. More specifically, the present disclosure relates to battery cells that may be used in vehicular contexts, as well as other energy storage/expending applications.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for supporting propulsion, start stop, and/or regenerative braking functions can be referred to as an xEV, where the term "xEV" is defined herein to include all of the below described electrical vehicles, or any variations or combinations thereof.

A "start-stop vehicle" is defined as a vehicle that can disable the combustion engine when the vehicle is stopped and utilize a battery (energy storage) system to continue powering electrical consumers onboard the vehicle, including the entertainment system, navigation, lights, or other electronics, as well as to restart the engine when propulsion is desired. A lack of brake regeneration or electrical propulsion distinguishes a "start-stop vehicle" from other forms of xEVs.

As will be appreciated by those skilled in the art, hybrid electric vehicles (HEVs) combine an internal combustion engine (ICE) propulsion system and a battery-powered electric propulsion system, such as 48 volt, 130 volt, or 300 volt systems. The term HEV may include any variation of a hybrid electric vehicle, in which features such as brake regeneration, electrical propulsion, and stop-start are included.

A specific type of xEV is a micro-hybrid vehicle (Micro-HEV). Micro-HEV vehicles typically operate at low voltage, which is defined to be under 60V. Micro-HEV vehicles typically provide start stop, and distinguish themselves from "start-stop vehicles" through their use of brake regeneration. The brake regeneration power can typically range from 2 kW to 12 kW at peak, although other values can occur as well. A Micro-HEV vehicle can also provide some degree of electrical propulsion to the vehicle. If available, the amount of propulsion will not typically be sufficient to provide full motive force to the vehicle.

Full hybrid systems (FHEVs) and Mild hybrid systems (Mild-HEVs) may provide motive and other electrical power to the vehicle using one or more electric motors, using only an ICE, or using both. FHEVs are typically high-voltage (>60V), and are usually between 200V and 400V. Mild-HEVs typically operate between 60V and 200V. Depending on the size of the vehicle, a Mild-HEV can provide between 10-20 kW of brake regeneration or propulsion, while a FHEV provides 15-100 kW. The Mild-HEV system may also apply some level of power assist, during acceleration for example, to supplement the ICE, while the FHEV can often use the electrical motor as the sole source of propulsion for short periods, and in general uses the electrical motor as a more significant source of propulsion than does a Mild-HEV.

In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of xEV that include all-electric or battery electric vehicles (BEVs), plug-in hybrid electric vehicles (PHEVs), and electric vehicle conversions of hybrid electric vehicles and conventional ICE vehicles. BEVs are driven entirely by electric power and lack an internal combustion engine. PHEVs have an internal combustion engine and a source of electric motive power, with the electric motive power capable of providing all or nearly all of the vehicle's propulsion needs. PHEVs can utilize one or more of a pure electric mode ("EV mode"), a pure internal combustion mode, and a hybrid mode.

xEVs as described above may provide a number of advantages as compared to more traditional gas-powered vehicles using only ICEs and traditional electrical systems, which are typically 12 volt systems powered by a lead acid battery. For example, xEVs may produce fewer undesirable emission products and may exhibit greater fuel efficiency as compared to traditional vehicles and, in some cases, such xEVs may eliminate the use of gasoline entirely, as is the case of certain types of BEVs.

As xEV technology continues to evolve, there is a need to provide improved power sources (e.g., battery systems or modules) for such vehicles. For example, it is desirable to increase the distance that such vehicles may travel without the need to recharge the batteries. Additionally, it may also be desirable to improve the performance of such batteries and to reduce the cost associated with the battery systems.

Conventional xEVs have been found to be functionally limited by their electric energy systems that supply power to their electric motor/generator and vehicle accessories. Typically, an electric motor is powered by an energy source that needs to store energy suitable for high-power discharges as well as for electric demands generated by various driving conditions.

In conventional electrical energy delivery systems for vehicles, e.g., xEVs, a plural sources of electrical energy can interfere with one another. Interference between these electrical energy sources can take the form of a conflict for control of the voltage of the power network, or a lack of synchronization with respect to handing off control of the voltage of the power network.

In any vehicle, one or more power networks (i.e., powernets) exist to allow supply and demand of electrical energy to meet. It is important that the powernet is operated in a stable manner, usually requiring the voltage to operate in a defined window. In a traditional non-hybridized ICE vehicle, two devices are capable of maintaining voltage on the powernet: the alternator (if it is on), or the battery. In this simple example, the battery is a passive device and can operate at the alternator output voltage or control the voltage via its own operation. In this way, the voltage on the powernet is naturally maintained.

In many representations of HEV, MHEV, or other vehicles, two or more electrical devices on the vehicle may be capable of providing, receiving, or transforming electrical energy. These devices may be batteries, capacitors, alternators, motors, generators, voltage/current/power regulation devices, such as inverters and DC/DC converters, or other devices. In some cases, there may exist more than one electrical device capable of actively controlling the powernet voltage or current. As a subset of those cases, it is also possible that all electrical devices are capable of controlling the powernet voltage or current.

At any time, only one "primary" device can control the powernet voltage or current; other "secondary" devices must recognize the control of the "primary" device. If this fails to occur, then either no device controls powernet voltage or current, or two or more devices conflict in their attempts to do so. Further, transfer of voltage or current control must be managed among devices capable of providing control such that the controlling device is itself stable and is providing/receiving/transforming sufficient current to maintain powernet stability. Failure to do so for even a brief time can cause interruption to critical vehicle functions.

Thus, there exists a need for a system and method configured to mitigate these control issues within a power network(s) of a vehicle.

SUMMARY

Disclosed herein is a system and method for controlling voltage on a power network (i.e., powernet) of an electrical vehicle.

In one aspect, a power control system for controlling a power network of a vehicle is provided. The power control system includes a power generating unit, one or more energy storage units coupled to at least one power converting unit, and an electrical load. The power control system further includes a control logic module for controlling the power generating unit and the power converting unit. The control logic module is configured to identify a power demand from the electrical load and to select the device best suited for providing powernet control from among the electrical energy supplying devices (e.g., the power generating unit or the one or more energy storage units) to control a voltage or current level of the power network. The determination of which electrical energy supplying device is best suited to provide control will be performed by the control logic module based on the identified power demand, based on electrical characteristics of the power generating unit, of the power converting unit, of the one or more energy storage devices, and of the electrical load. These factors will be based on the historical, current, and predicted modes of operation of the vehicle.

In another aspect, a computer-implemented method of controlling a power network of a vehicle, the power network having a power generating unit, one or more energy storage units coupled to a power converting unit, an electrical load, and a control logic module. The method includes identifying a power demand from the electrical load, and selecting, using a processor associated with the control logic module, the power generating unit or one of the one or more energy storage units to control a state level of the power network in response to the identified power demand, based on electrical characteristics of the power generating unit, of the power converting unit, and of the electrical load, and based on a historical, current, and predicted mode of operation of the vehicle.

These as well as other aspects, advantages, and alternatives will become apparent to those of ordinary skill in the art by reading the following detailed description, with reference where appropriate to the accompanying drawings. Further, it should be understood that the disclosure provided in this summary section and elsewhere in this document is intended to discuss the embodiments by way of example only and not by way of limitation.

BRIEF DESCRIPTION OF THE FIGURES

These and other features, aspects, and advantages of the present disclosure will become better understood when the following detailed description is read with reference to the accompanying drawings in which like characters represent like parts throughout the drawings, wherein:

FIG. 5B is a block diagram illustrating an exemplary embodiment a power network system of a hybrid electrical vehicle where each of energy supplying and consuming devices include a respective control logic unit;

DETAILED DESCRIPTION

Figure 1:
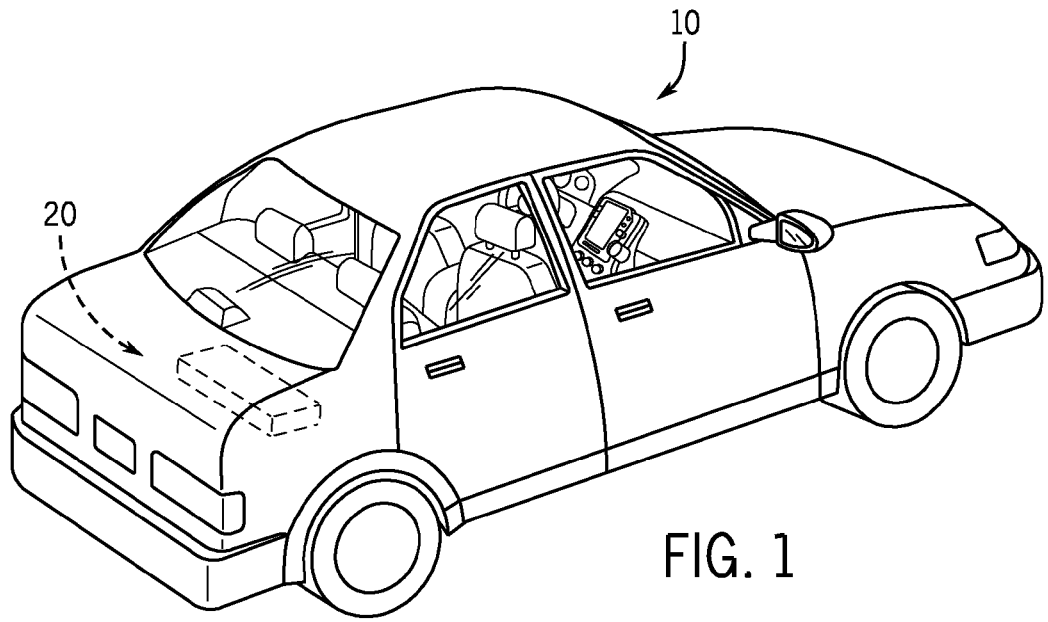
FIG. 1 is a perspective view of a vehicle (an xEV) having a battery system contributing all or a portion of the power for the vehicle, in accordance with an embodiment of the present approach.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

As discussed above, there are several different types of xEVs. Although some vehicle manufacturers, such as TESLA®, produce only xEVs and, thus, can design the vehicle from scratch as an xEV, most vehicle manufacturers produce primarily traditional ICEs. Thus, when one of these manufacturers also desires to produce an xEV, it often utilizes one of its traditional vehicle platforms as a starting point. As can be appreciated, when a vehicle has been initially designed to use a traditional electrical system powered by a single lead acid battery and to utilize only an ICE for motive power, converting such a vehicle into its HEV version can pose many packaging problems. For example, an FHEV uses not only these traditional components, but one or more electric motors must be added along with other associated components. As another example, an mHEV also uses not only these traditional components, but a higher voltage battery (e.g., a 48V lithium ion battery module) must be placed in the vehicle to supplement or replace the 12V lead acid battery along with other components such as a belt integrated starter-generator, sometimes referred to as a belt alternator starter (BAS), as described in further detail below. Hence, if a battery system can be designed to reduce such packaging problems, it would make the conversion of a traditional vehicle platform into an xEV less costly and more efficient. As used herein, the BAS is not intended to be limited to a belt-driven alternator starter, as other types of drives could be used.

The battery systems described herein may be used to provide power to a number of different types of xEVs as well as other energy storage applications (e.g., electrical grid power storage systems). Such battery systems may include one or more battery modules, each battery module having a number of battery cells (e.g., lithium ion electrochemical cells) arranged to provide particular voltages and/or currents useful to power, for example, one or more components of an xEV. Presently disclosed embodiments include lithium ion battery modules that are capable of providing more than one voltage. In particular, certain disclosed battery systems may provide a first voltage (e.g., 12V), for example, to power ignition of a combustion engine using a traditional starter motor and/or support conventional 12V accessory loads, and may provide a second voltage (e.g., 48V), for example, to power a BAS and to power one or more vehicle accessories when the combustion engine is not running, for use in a micro-hybrid system for example. Indeed, in certain embodiments, not only may a single battery system provide two voltages (e.g., 12V and 48V), but it can provide them from a package having a form factor equivalent to a traditional lead acid 12V battery, thus making packaging and conversion of a traditional vehicle to a mHEV simpler, less costly and more efficient.

Present embodiments also include physical battery module features, assembly components, manufacturing and assembling techniques, and so forth, that facilitate providing disclosed battery modules and systems that have a desired form factor (e.g., dimensions corresponding to a traditional lead acid battery). Further, as set forth in detail below, the disclosed battery module embodiments include a number of heat transfer devices (e.g., heat sinks, liquid-cooling blocks, heat transfer foams, phase change materials (PCMs), and so forth) that may be used to passively or actively maintain one or more temperatures of the battery module during operation.

With the foregoing in mind, FIG. 1 is a perspective view of an xEV 10 in the form of an automobile (e.g., a car) having a battery system 20 in accordance with present embodiments for providing all or a portion of the power (e.g., electrical power and/or motive power) for the vehicle 10, as described above. Although the xEV 10 may be any of the types of xEVs described above, by specific example, the xEV 10 may be a mHEV, including an ICE equipped with a micro-hybrid system which includes a start-stop system that may utilize the battery system (energy storage system) 20 to power at least one or more accessories (e.g., AC, lights, consoles, etc.), as well as the ignition of the ICE, during start-stop cycles.

Further, although the xEV 10 is illustrated as a car in FIG. 1, the type of vehicle may differ in other embodiments, all of which are intended to fall within the scope of the present disclosure. For example, the xEV 10 may be representative of a vehicle including a truck, bus, industrial vehicle, motorcycle, recreational vehicle, boat, or any other type of vehicle that may benefit from the use of electric power. Additionally, while the battery system 20 is illustrated in FIG. 1 as being positioned in the trunk or rear of the vehicle, according to other embodiments, the location of the battery system 20 may differ. For example, the position of the battery system 20 may be selected based on the available space within a vehicle, the desired weight balance of the vehicle, the location of other components used with the battery system 20 (e.g., battery management systems, vents or cooling devices, etc.), and a variety of other considerations.

Figure 2:
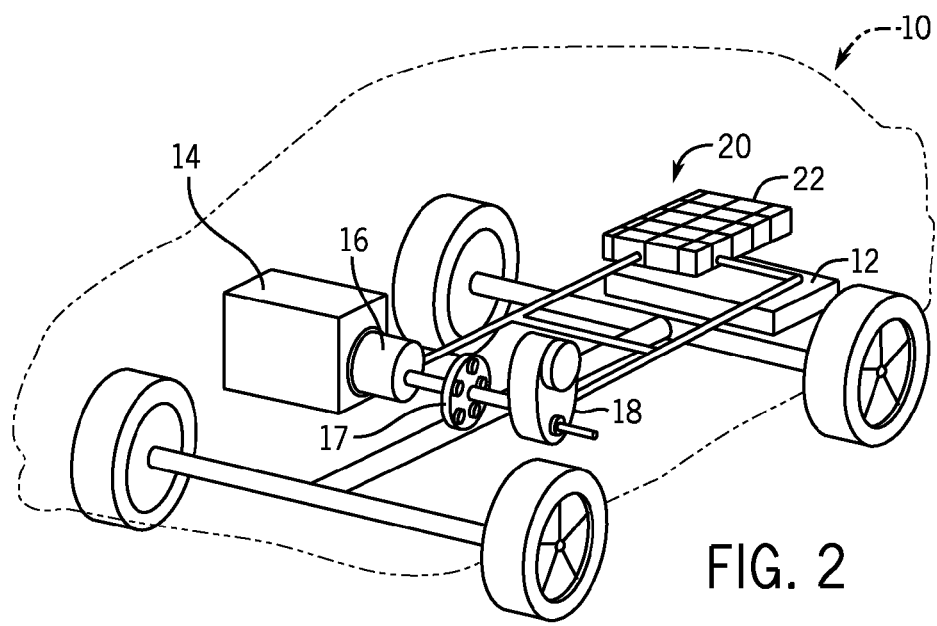
FIG. 2 is a cutaway schematic view of the xEV embodiment of FIG. 1 in the form of a hybrid electric vehicle (HEV), in accordance with an embodiment of the present approach.

FIG. 2 illustrates a cutaway schematic view of an embodiment of the xEV 10 of FIG. 1, provided in the form of an HEV having the battery system 20, which includes one or more battery modules 22. In particular, the battery system 20 illustrated in FIG. 2 is disposed toward the rear of the vehicle 10 proximate a fuel tank 12. In other embodiments, the battery system 20 may be provided immediately adjacent the fuel tank 12, provided in a separate compartment in the rear of the vehicle 10 (e.g., a trunk), or provided in another suitable location in the xEV 10. Further, as illustrated in FIG. 2, an ICE 14 may be provided for times when the xEV 10 utilizes gasoline power to propel the vehicle 10. The vehicle 10 also includes an electric motor 16, a power split device 17, and a generator 18 as part of the drive system.

The xEV vehicle 10 illustrated in FIG. 2 may be powered or driven by the battery system 20 alone, by the ICE 14 alone, or by both the battery system 20 and the ICE 14. It should be noted that, in other embodiments of the present approach, other types of vehicles and configurations for the vehicle drive system may be utilized, and that the schematic illustration of FIG. 2 should not be considered to limit the scope of the subject matter described in the present application. According to various embodiments, the size, shape, and location of the battery system 20, the type of vehicle, the type of xEV technology, and the battery chemistry, among other features, may differ from those shown or described.

The battery system 20 may generally include one or more battery modules 22, each having a plurality of battery cells (e.g., lithium ion electrochemical cells), which are discussed in greater detail below. The battery system 20 may include features or components for connecting the multiple battery modules 22 to each other and/or to other components of the vehicle electrical system. For example, the battery system 20 may include features that are responsible for monitoring and controlling the electrical and thermal performance of the one or more battery modules 22.

Figure 3:
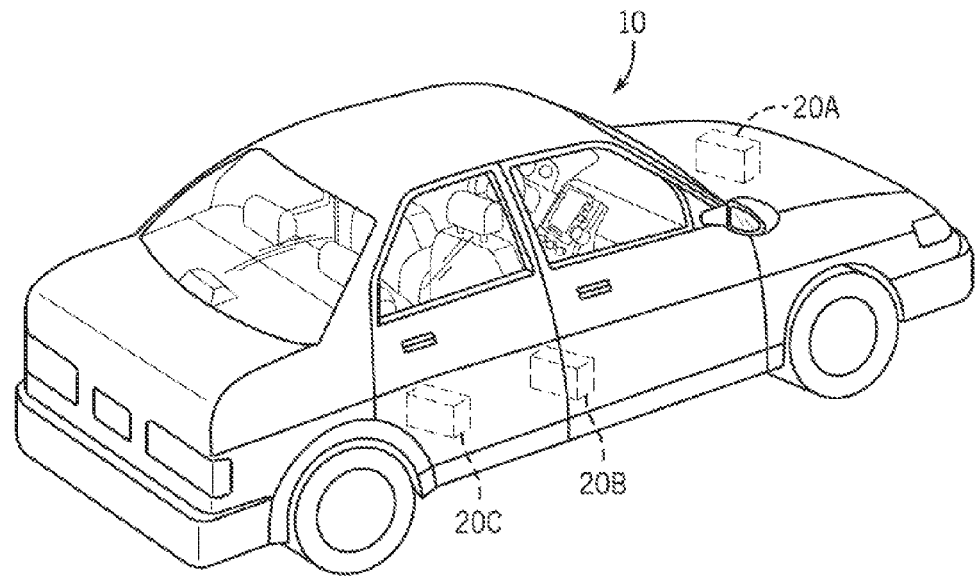
FIG. 3 is a cutaway schematic view of an embodiment of the xEV of FIG. 1 in the form of a micro-hybrid electric vehicle (mHEV), in accordance with an embodiment of the present approach.

FIG. 3 illustrates a cutaway schematic view of another embodiment of the xEV 10 of FIG. 1, provided in the form of a mHEV 10 having the battery system 20. As discussed above, the battery system 20 for use with a micro-hybrid system of an mHEV 10 may include a single battery that provides a first voltage (e.g. 12V) and a second voltage (e.g. 48V) and that is substantially equivalent in size to a traditional 12V lead acid battery used in traditional vehicles utilizing ICEs. Hence, such a battery system 20 may be placed in a location in the mHEV 10 that would have housed the traditional battery prior to conversion to an mHEV. For example, as illustrated in FIG. 3, the mHEV 10 may include the battery system 20A positioned similarly to a lead-acid battery of a typical combustion-engine vehicle (e.g., under the hood of the vehicle 10). By further example, in certain embodiments, the mHEV 10 may include the battery system 20B positioned near a center of mass of the mHEV 10, such as below the driver or passenger seat. By still further example, in certain embodiments, the mHEV 10 may include the battery system 20C positioned below the rear passenger seat or near the trunk of the vehicle. It should be appreciated that, in certain embodiments, positioning a battery system 20 (e.g., battery system 20B or 20C) in or about the interior of the vehicle 10 may enable the use of air from the interior of the vehicle to cool the battery system 20 (e.g., using a heat sink or a forced-air cooling design, as set forth in detail below).

Figure 4:
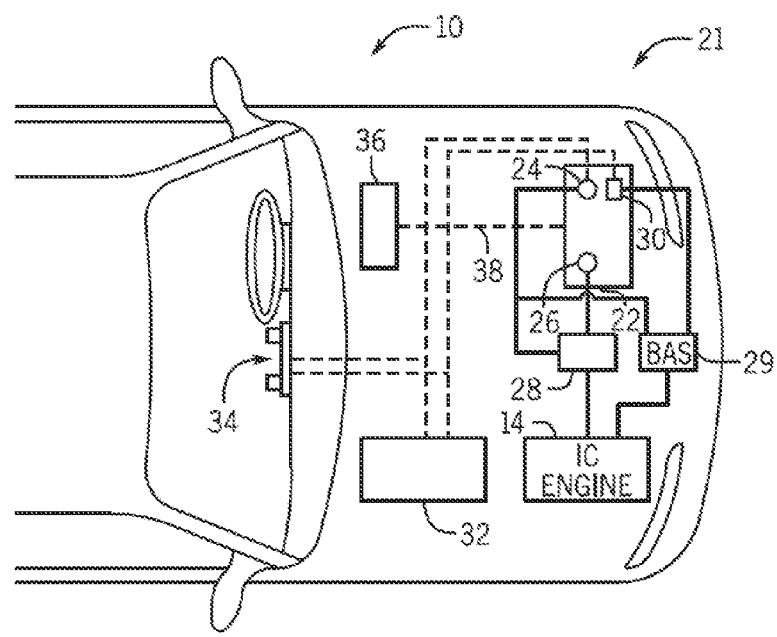
FIG. 4 is a schematic view of the mHEV embodiment of FIG. 3 illustrating power distribution throughout the mHEV, in accordance with an embodiment of the present approach.

FIG. 4 is a schematic view of an embodiment of the mHEV 10 of FIG. 3 having an embodiment of an energy system 21 disposed under the hood of the vehicle 10 and includes battery system 20. As previously noted and as discussed in detail below, the battery system 20 may further have dimensions comparable to those of a typical lead-acid battery to limit or eliminate modifications to the mHEV 10 design to accommodate the battery system 20. Further, the battery system 20 illustrated in FIG. 4 is a three-terminal battery that is capable of providing two different output voltages. For example, a first terminal 24 may provide a ground connection, a second terminal 26 may provide a 12V output, and a third terminal 30 may provide a 48V output. As illustrated, the 48V output of the battery module 22 may be coupled to a BAS 29, which may be used to start the ICE 14 during start-stop cycles, and the 12 V output of the battery module 22 may be coupled to a traditional ignition system (e.g., starter motor 28) to start the ICE 14 during instances when the BAS 29 is not used to do so. It should also be understood that the BAS 29 may also capture energy from a regenerative braking system or the like (not shown) to recharge the battery module 22.

It should be appreciated that the 48 V and 12 V outputs of the battery module 22 may also be provided to other components of the mHEV 10. Examples of components that may utilize the 48 V output in accordance with present embodiments include radiator cooling fans, climate control fans, electric power steering systems, active suspension systems, electric air-conditioning systems, auto park systems, cooled seats, electric oil pumps, electric super/turbochargers, electric water pumps, heated seats, heated windscreen/defrosters, and engine ignitions. Examples of components that may utilize the 12 V output in accordance with present embodiments include window lift motors, vanity lights, tire pressure monitoring systems, sunroof motor controls, power seats, alarm systems, infotainment online features, navigation features, lane departure warning systems, electric parking brakes, and external lights. The examples set forth above are not exhaustive and there may be overlap between the listed examples. Indeed, for example, in some embodiments, features listed above as being associated with a 48 V load may utilize the 12 V output instead and vice versa.

In the illustrated embodiment, the 48 V output of the battery module 22 may be used to power one or more accessories of the mHEV 10. For example, as illustrated in FIG. 4, the 48 V output of the battery module 22 may be coupled to the heating, ventilation, and air conditioning (HVAC) system 32 (e.g., including compressors, heating coils, fans, pumps, and so forth) of the mHEV 10 to enable the driver to control the temperature of the interior of the mHEV 10 during operation of the vehicle. This is particularly important in the mHEV 10 during idle periods when the ICE 14 is stopped and, thus, not providing any electrical power via engine charging. As also illustrated in FIG. 4, the 48 V output of the battery module 22 may be coupled to the vehicle console 34, which may include entertainment systems (e.g., radio, CD/DVD players, viewing screens, etc.), warning lights and indicators, controls for operating the mHEV 10, and so forth. Hence, it should be appreciated that the 48 V output may, in certain situations, provide a more efficient voltage at which to operate the accessories of the mHEV 10 (e.g., compared to 12 V), especially when the ICE 14 is stopped (e.g., during start-stop cycles). It should also be appreciated that, in certain embodiments, the 48 V output of the battery module 22 may also be provided to any other suitable components and/or accessories (e.g., lights, switches, door locks, window motors, windshield wipers, and so forth) of the mHEV 10.

Also, the mHEV 10 illustrated in FIG. 4 includes a vehicle control unit/module (VCM) 36 that may control one or more operational parameters of the various components of the vehicle 10, and the VCM 36 may include at least one memory and at least one processor programmed to perform such tasks. Like other components of the mHEV 10, the battery module 22 may be coupled to the VCM 36 via one or more communication lines 38, such that the VCM 36 may receive input from the battery module 22, and more specifically, a battery control module (BCM) of the battery module 22 (discussed in detail below). For example, the VCM 36 may receive input from the battery module 22 regarding various parameters, such as state of charge and temperature, and the VCM 36 may use these inputs to determine when to charge and/or discharge the battery module 22, when to discontinue charging the battery module 22, when to start and stop the ICE 14 of the mHEV 10, whether to use the BAS 29 or the starter 28, and so forth.

As stated above, hybrid-electric, micro-hybrid and stop-start vehicles include an internal combustion engine (e.g., the ICE 14) that is turned off when the vehicle stops, such as at a stop sign or stoplight, thereby reducing the amount of combustible fuel consumed and the amount of emissions released into the environment. Micro-hybrid technology uses battery-powered systems to provide energy to various electronic systems in vehicles without reliance upon continuous operation of the ICE. When the ICE is stopped, one or more batteries may power electrical subsystems, such as cabin temperature regulation, audio, video, navigation, and other electronic loads operating within the vehicle. These powered subsystems are herein termed "electrical consumers" or "consuming units," because as electrical loads these accessories draw electrical power but do not generate any electrical power.

Micro hybrid and mild-hybrid vehicles require a more powerful and longer-lasting energy storage system (ESS), which may include lithium ion batteries, advanced lithium batteries, nickel-metal-hydride (NiMH) batteries, capacitors, advanced lead-acid batteries, and/or other electrical storage devices, in addition to conventional lead-acid batteries. The ESS in a micro-hybrid, mild hybrid, or hybrid-electric vehicle is also supplied power from a regenerative power source, such as a regenerative braking system, or from a renewable energy generating device/unit, such as a solar panel, a wind turbine, a vibrational energy recovery system, or other electrical providers.

Figure 6:
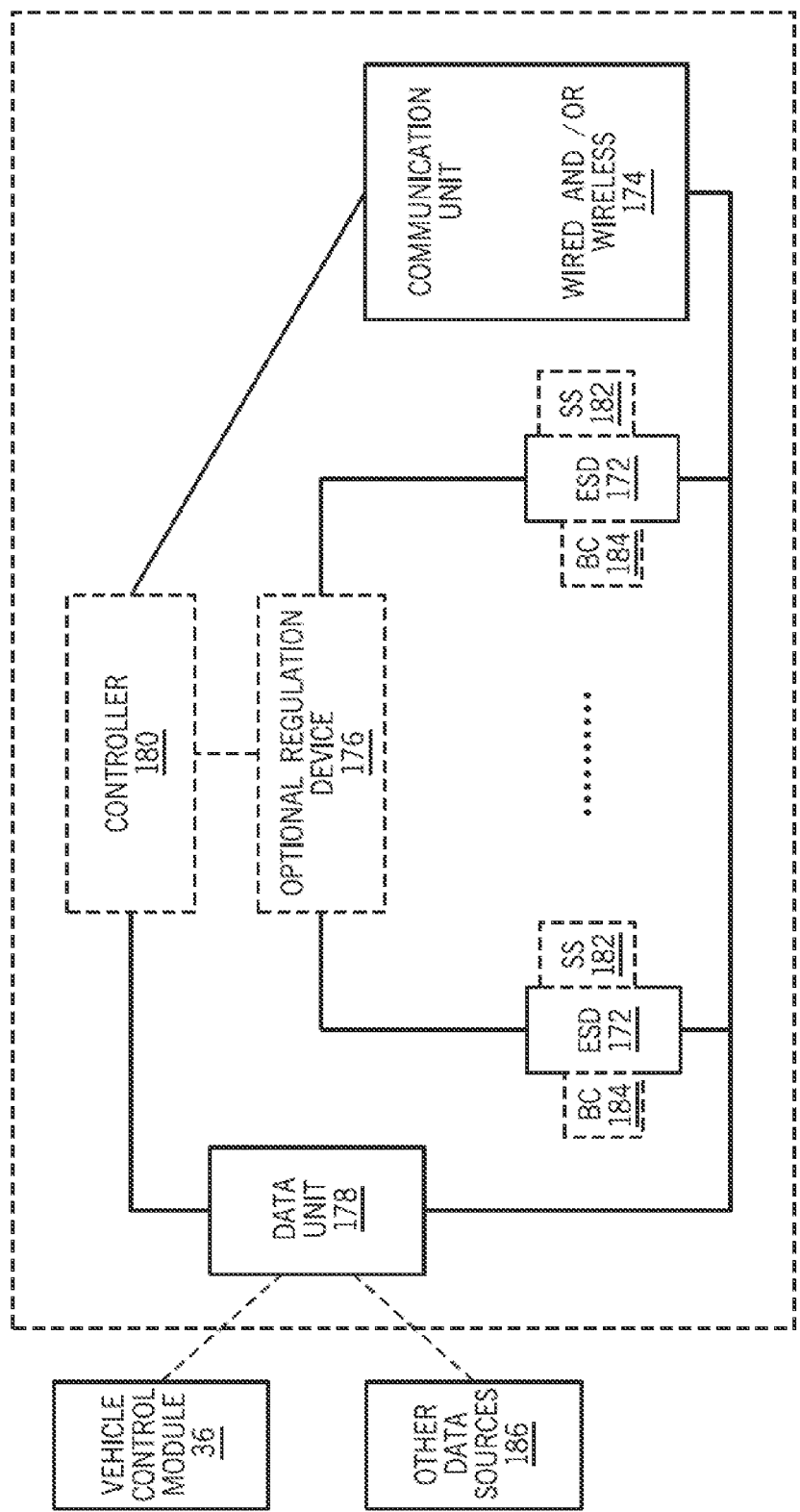
FIG. 6 is a functional block diagram illustrating an exemplary embodiment of an energy storage system.

Now referring to FIG. 6, an exemplary embodiment of an ESS 170 that may be used with the vehicle 10 is shown. The ESS 170 may include two or more energy storage devices (ESDs) 172 such as batteries, capacitors, ultra capacitors, or any other type of energy storage device capable of providing stored power to a vehicle accessory load and to an engine starting unit. The ESS 170 further includes a communication unit 174, an optional voltage/current/power regulating (regulation) device 176, a data unit 178, and a controller 180. Moreover, each of the ESDs 172 may be coupled to a state sensing (SS) unit 182 and to a battery controller (BC) 184.

Sensing and/or other data may be collected by the data unit 178 from the vehicle 10, from vehicle accessories (not shown), from the energy storage devices 172, from drivetrain components (not shown), and/or from other data sources 186, such as environmental data sources. This data can be communicated to the controller 180, and/or the VCM 36. This transfer can be performed by the communication unit 174, which can be either a wired or wireless unit, and may use any communication protocol. The data, from one or more of the units 176, 182, 184, other data sources 186, and the VCM 36, may be needed by the controller 180 and/or the regulation device 176 to perform their control and/or regulation functions.

By providing some or all of the power to a power network which powers the vehicle's accessories, and by relying on mainly power from a regenerative power source, the ESS in a micro-hybrid, mild-hybrid, or hybrid-electric vehicle will serve to increase the vehicle's fuel efficiency. A state of the power network can be a current, voltage, power, or other characteristic.

However, these gains in fuel efficiency require the management and coordination of one (or more) electrical producers and one (or more) electrical storage devices, some of which may operate intermittently. Accordingly, except for systems that are exclusively electrical energy consumers, the alternator/generator, the batteries, the capacitors, and the like need to be managed electrically on the power network in both consumption and delivery modes of operation. As known, the alternator or generator is arranged to supply electrical energy by conversion of mechanical energy derived from the ICE. Moreover, regenerative braking units are configured to convert the kinetic energy of the moving vehicle into electrical energy during braking.

As stated above, in a system for providing electrical energy to electrical consumers from a plurality of electrical energy delivering/transforming/supplying devices or units, such as batteries, capacitors, generators, alternators, voltage/current/power regulation devices, such as inverters and DC/DC converters, among others, issues may arise as to which electrical energy delivering device is controlling the voltage of the power network. For example, if a demand/request for electrical energy is requested by one or more electrical consumers (i.e., vehicle's electrical loads) the system may identify multiple electrical energy supplying devices that are at different voltages when the requested power demand is received. One identification result could be that electrical energy from a higher voltage electrical energy supply device is drawn to a lower voltage electrical energy supply device, thereby diverting energy away from the electrical consumer that requested the power demand. This may be particularly problematical in the event that one or more of the electrical energy supplying devices that has been coupled to the power network is in a discharged or partially discharged state, whereby its voltage at the request time is lower than one voltage level suitable to providing the electrical energy requested by the electrical consumer. Absent the involvement of a control unit to establish priorities in the delivery of electrical energy and to control the flow of electrical energy accordingly, a conflict at which one of the plurality of electrical energy supplying devices may control the power network voltage and current flow in response to the requested power demand may occur.

Another problem may arise based on the timing of the electrical energy supplying devices that may provide control of the voltage or current of the powernet. An electrical energy supplying device that is controlling the voltage or current may shut off, either intentionally or due to a malfunction. In this case, the voltage or current may increase or decrease in a manner that causes interruption to vehicle function. Other situations may arise in which the electrical throughput of an electrical energy supplying device is insufficient for it to control the voltage or current of the powernet, despite being configured to do so. These situations may arise due to changes in accessory demand, vehicle function, driver demand, incorrect operation, or other causes. In any of these cases, it is necessary to monitor the powernet and plan switch-off of powernet control between electrical energy supplying devices such that exactly one electrical energy supplying device is always in control of the current or voltage of the powernet, and that said electrical energy supplying device is capable of doing so successfully.

In accordance with one embodiment of the present disclosure, a power control system includes a control logic module (i.e., computerized function) configured to determine/establish priorities in the delivery of electrical energy. Moreover, in one embodiment, the control logic module is configured to control a flow of electrical energy to and/or from each of the units coupled to the power network (i.e., electrical energy supplying units and electrical consuming units, in accordance with their respective predetermined characteristics/parameters. As stated above, in some embodiments, more than one electrical energy supplying device of the power network can be capable of actively controlling the powernet voltage or current. As such, it is also possible that all electrical energy supplying devices are capable of controlling the powernet voltage or current. In another exemplary embodiment, the control logic module is programmed to manage the selection of an electrical energy supplying device that controls the voltage, current, or energy of the power network.

In accordance with an embodiment, only one electrical energy supplying device at a time is configured to control the state of the power network to maintain stability of the power network. If the current generated or flowing through an electrical energy supplying device is predicted to reach a low undesirable threshold, if is expected to switch off, or if another reason exists that it may become unstable, the electrical energy supplying device's ability to control the power network is compromised. Thus, the control logic module is configured to implement available information to determine/select, predictively and/or reactively, which electrical energy supplying device is suitable and able to control the state of the power network based on intended power setting for each electrical energy supplying device, and to switch or transition control to another appropriate electrical energy supplying device based upon changing characteristics of the powernet, including device and accessory demands. In one embodiment, the process of determining the most suitable electrical energy supplying device includes assigning a score of suitability to all electrical energy supplying devices capable of controlling the state of the power network based on their respective current and future characteristics, and the electrical energy supplying device assigned the highest score is selected as the most suitable electrical energy supplying device.

As indicated, the electrical energy supplying device to which such control is switched becomes the controlling unit. Thus, the controlling unit continues to control the electrical state of the power network while its on-going and future characteristics favor it over the other available electrical energy supplying devices based on its score, and can be replaced by a more suitable electrical energy supplying device when the control logic module determines that this other more suitable electrical energy supplying device has a higher score and thus becomes the more appropriate controlling unit.

In one exemplary arrangement, the power control system includes an energy storage device, which is coupled to a DC/DC converter that in turn is coupled to a power network. Additionally, the power network is connected to a starter and a motor/generator with an integrated inverter. Other alternate arrangements could have different numbers of energy storage devices connected to DC/DC converters, or could include energy storage devices directly connected to the power network with no DC/DC converter. Additionally, the motor/generator could be replaced by an alternator. Alternatively, the starter unit and the generator/motor unit can be combined into an integrated starter-generator that provides both starter and generator functions. Moreover, the starter unit is typically coupled to an ICE. The coupling of the energy storage devices with the voltage/power regulation devices can support different voltages of the energy storage devices to meet different power requirements of electrical loads. Additionally, devices or units associated with the power network may be coupled to each other in any arrangement that is suitable for the implementation of the present approach.

Figure 5A:
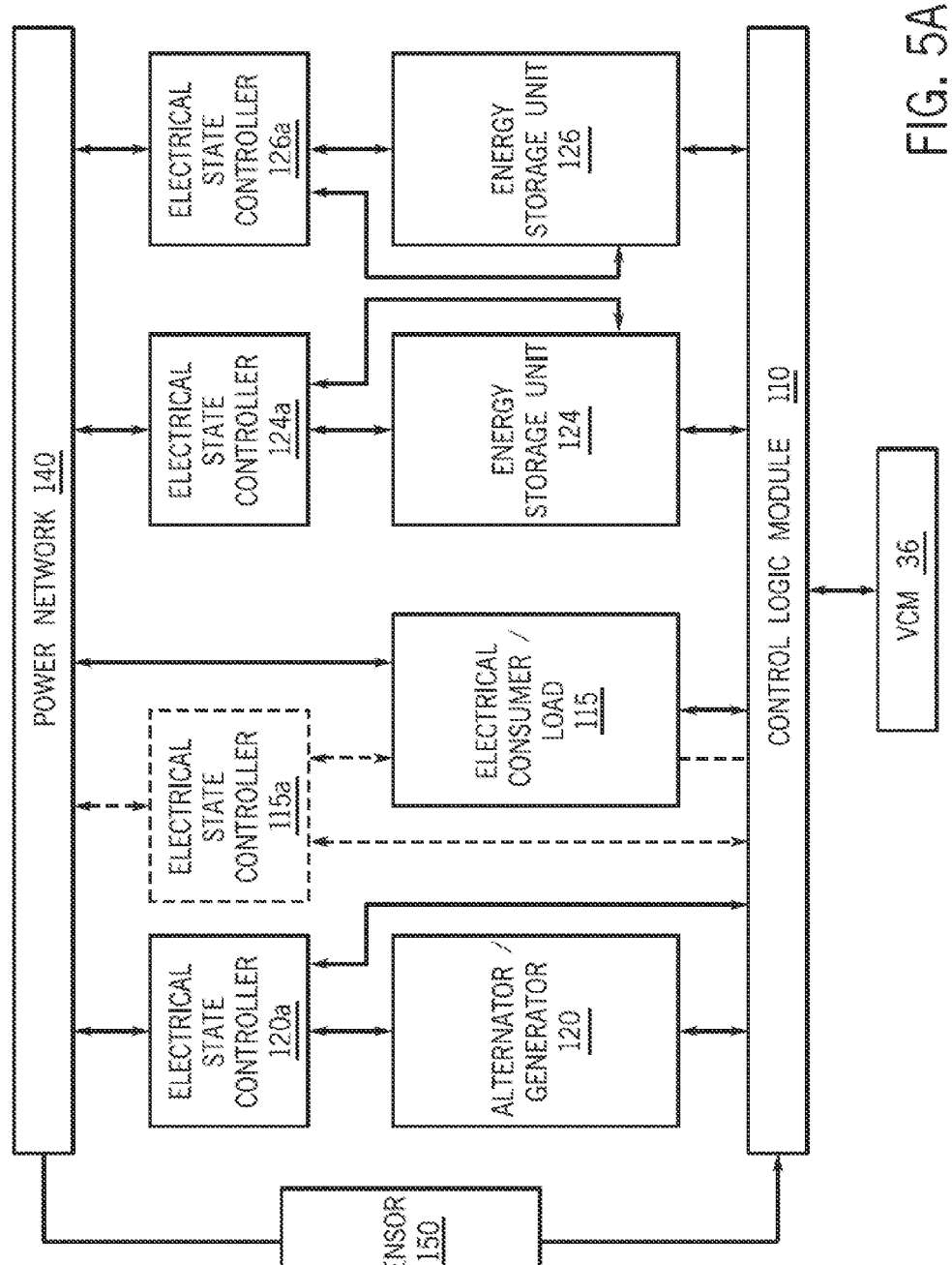
FIG. 5A is a block diagram illustrating an exemplary embodiment a power network system of a hybrid electrical vehicle.

Now referring to FIG. 5A, an exemplary embodiment of a power control system 100 is shown. Power control system 100 includes a control logic module 110 and the VCM 36. Control logic module 110 is configured to receive or identify a power demand from an electrical load, such as electrical accessory/consumer 115, and distributes it among other units of power control system 100, while only one of the units may control the power network voltage at any given time. In another embodiment, as shown in FIG. 5B, each of units 120, 115, 124, and 126 has an integrated or coupled to control logic module 110.

As shown in FIG. 5A and stated above, power control system 100 includes a plurality of electrical units, some of which generate electrical power (i.e., electrical energy supplying devices), others of which are exclusively consumers of electrical power (i.e., electrical consuming units), and yet others consume and supply electrical power. In this exemplary embodiment, electrical consumer 115 consumes electrical energy at times that are independent of the operation of the ICE 14 (not shown). Electrical consumer 115 is illustrative of a plurality of power consumers in vehicle 10 that includes, by way of example and without limitation, an audio system, cabin air blowers, cabin and exterior lamps, an air conditioning system, windshield wipers, seat heaters, window and moon roof panels, door and trunk openers and locks, navigation electronics, and other electrical accessories (not shown).

Power control system 100 further includes an alternator and/or generator 120, which can supply electrical energy when the ICE 14 is operating. In one embodiment, a starter may be integrated with generator 120 or with an electric motor (not shown), thereby can, if so configured, operate as a consumer and a supplier of electrical energy during its respective states of operation and the operating state of the ICE.

Power control system 100 further includes an energy storage device 124. As such, energy storage device 124 is both, a consumer and provider of electrical energy. Unlike alternator and/or generator 120, the ability of energy storage device 124 to function in either state, or to be quiescent, is independent of the operating condition of the ICE 14. A determination of the SOC of energy storage device 124 is determined in no small measure in response to the type of battery that is being used. For example, when energy storage device 124 is a lead-acid battery, the battery voltage can be used as a predictor of its SOC. When energy storage device 124 is a lithium ion battery, the battery voltage and the battery temperature are both required to predict its SOC.

Power control system 100 further includes another energy storage device 126. Similarly to energy storage device 124, energy storage device 126 can function to supply or consume electrical energy independent of the state of operation of the ICE 14. As shown, energy storage devices 124 and 126 are associated with the ESS 170, which may include additional energy storage devices.

Optionally, power control system 100 may further be configured to handle braking regenerative energy supplied by a regenerative braking system that includes a drive train coupled to the motor/generator that converts a kinetic energy of the moving vehicle into electrical energy. In addition to operating within the context of the specification of the braking system of the vehicle, the operation of a regenerative braking system is related to a vehicle speed, a rate of deceleration, and an actuation of the vehicle's antilock braking (ABS) system, and so forth.

In accordance with the disclosure, one or more of alternator/generator 120, energy storage device 124, and energy storage device 126, is coupled to an electrical state controller capable of regulating voltage, current, power, and/or other electrical characteristics. In another embodiment, an electrical state controller may be integrated with each of the power network units. The electrical state controller can be a component of an electrical unit capable of regulating voltage, current, power, and/or other states on the one or more vehicle powernets.

As stated above, the primary state of a power network to be controlled can be a current to a consuming unit instead of a voltage of that consuming unit. In one embodiment, the voltage state can be controlled by respectively associated electrical state controllers 120a, 124a, and 126a, which can be DC/DC converters. In another embodiment, some or all of the electrical state controllers can include switches (not shown) that can be actuated to couple or decouple the respectively associated electrical units to or from a power network 140 in response to commands from control logic module 110.

In one embodiment, electrical consumer 115 may not be coupled to an associated electrical state controller 115a. Thus, as illustrated in FIG. 5A, this associated electrical state controller 115a is an optional unit. Most consumers of electrical energy of vehicle 10 simply consume the electricity at all times when they are under operation. However, in some embodiments, the vehicle power network is protected from instability on the powernet via a controller device. For example, electronic controls of an automatic transmission may be powered down when the vehicle is stopped and the ICE is shut off. Similarly, it may be desirable to disengage some units such as engine control computing units, fan and air conditioner clutches, instruments that display engine operating characteristics, certain instrument panel lamps, and the like, that are not necessary when the ICE is shut off. Such control commands are issued by control logic module 110 to electrical consumer 115.

In one embodiment, irrespective of whether electrical consumer 115 is provided with the electrical state controller 115a, control logic module 110 may receive or identify a power demand implicitly based on an electrical energy draw. Control logic module 110 may distribute the power demand among one or more of the electrical energy supplying devices, in accordance with a method (process) discussed hereafter.

Although several of the electrical energy supplying devices, discussed above, can be used to fulfill the power demand, only one such electrical energy supplying device is selected to control the voltage (or current) of vehicle power network 140 at any given time. The selected controlling electrical energy supplying device can be termed as the "master" controlling unit during the controlling period of the electrical state of vehicle power network 140.

In one embodiment, the power network 140 can be fully controlled by the selected master controlling unit, in which case all energy may flow through the electrical state controller, e.g., DC/DC converters) between the electrical energy supplying device and the vehicle power network 140. In such an embodiment, control logic module 110 may set the power input/output setting for each unit of power control system 100. Moreover, if the current flowing through the selected master controlling unit trends toward an undesirable state, such as zero current for example, its ability to successfully control the power network 140 becomes compromised. In accordance with one embodiment, information that is accessible by control logic module 110 or provided by VCM 36 can be provided to control logic module 110 to determine predictively which of the available electrical energy supplying devices is best suited to control the state of vehicle power network 140 based on intended power setting for each electrical energy supplying device (among other information). Thus, control over the vehicle power network 140 can be switched to an appropriate unit, and the power setting is changed to conform to the characteristics of the presently controlling unit. Data corresponding to such characteristics can be stored in a memory unit 135 (shown in FIG. 10A) of control logic module 110. Alternatively, this characteristics data may be stored in a memory unit associated with VCM 36.

In one embodiment, control logic module 110 is configured to receive data corresponding to the current or voltage condition of the vehicle power network 140 via one or more sensors 150. Such information can be used in enabling control logic module 110 to control the various electrical energy supplying devices to achieve a desired condition/state in the vehicle power network 140. However, other information can be useful to achieve on-going (i.e., present) control over the state of the vehicle power network 140, and to predict a future state of the power network 140 as well as to formulate a predicting strategy. In this regard, VCM 36 is configured to provide vehicle data to control logic module 110 that can correspond to the vehicle speed, the operating state of the ICE 14, the braking state, which can include the rate of deceleration, the accelerator state, and so forth. Control logic module 110 can also retrieve battery related information from energy storage units 124 and 126, which can include state of charge (SOC), state of health (SOH), power input/output capability, remaining capacity, and so forth.

Additionally, the VCM 36 may provide other kinds of data, such as ambient data, to the control logic module 110. These other kinds of data may include global positioning system (GPS) location data, which can include speed limits and elevation changes along a programmed route; an ambient temperature, which is useful in its effect on battery capacity; and real-time traffic conditions, which enable control logic module 110 to predict rates and frequency of braking as well as accelerations and expected periods between vehicle stops.

Regarding the memory unit 135, the data stored therein corresponds to specifications and operating characteristics of the various of electrical energy supplying devices, as well as characteristics of the electrical consuming units. In one embodiment, the memory unit 135 may contain historical information of any or all of the sources of data described above, as well as a change in performance over time that would indicate wear and a need for replacement. In addition, memory unit 135 may store data that can characterize a transient response of the electrical energy supplying devices, whereby a strategy is formulated that minimizes undesirable voltage or current fluctuations when control over the vehicle power network 140 is turned over to another unit by the control logic module 110.

In another embodiment, as shown in FIG. 5B, each of units 120, 115, 124, and 126 has an integrated or coupled control logic module 120*b*, 115*b*, 124*b*, and 126*b*, and the power control system 100 does not include a central control logic module. Instead, the modules 120*b*, 115*b*, 124*b*, and 126*b* will select a controlling unit master from amongst themselves.

Figure 7:
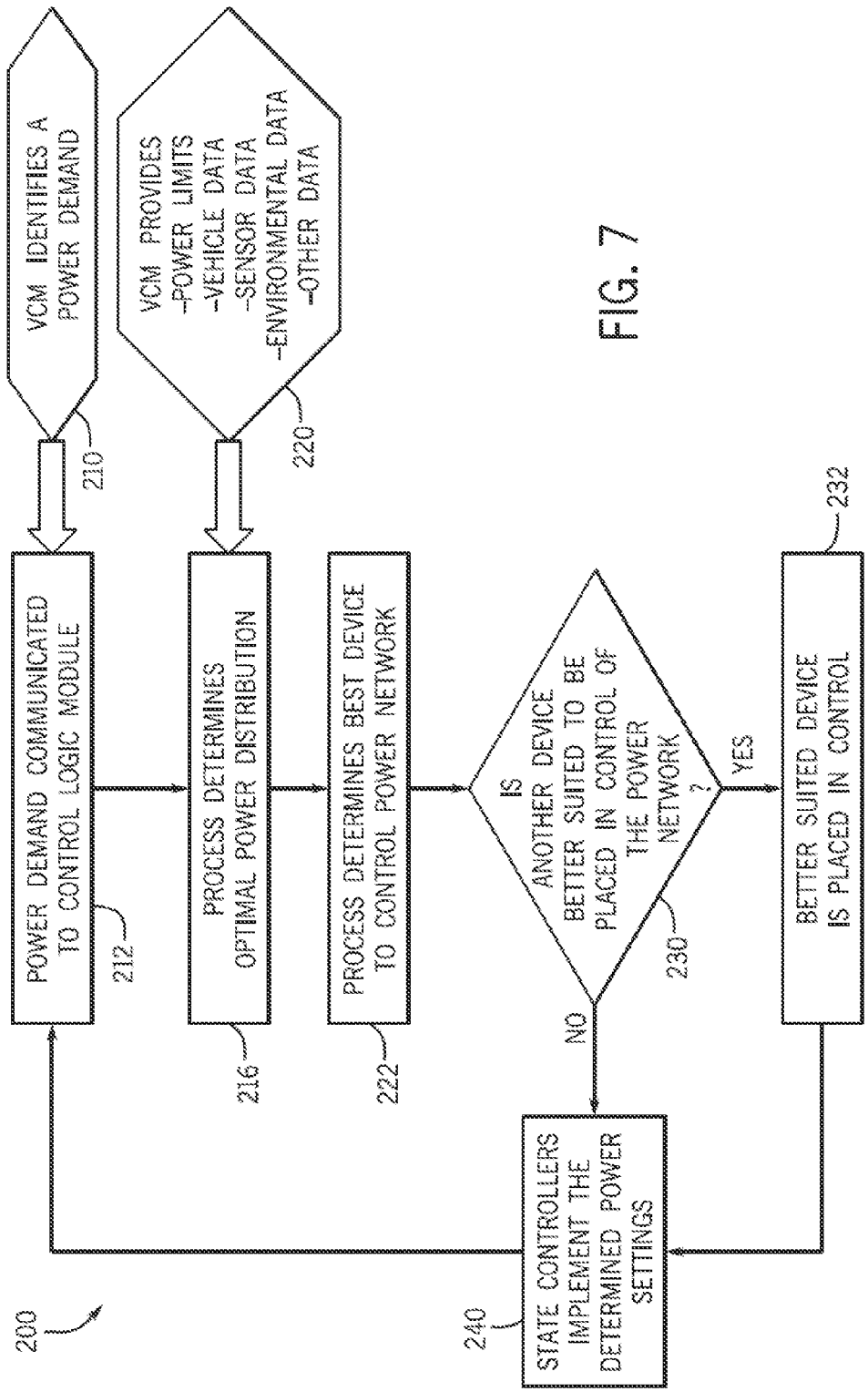
FIG. 7 is a flow chart illustrating an exemplary embodiment of a method for selecting a unit among a plurality of units to control a voltage of the power network based on power demand received from a power consumer.

Now referring to FIG. 7, a flow chart shows an exemplary method 200 for determining the best electrical energy supply device for controlling power network 140 and designated as the singular controller. As shown in FIG. 7, VCM 36 is configured to identify a power demand, at Step 210, which is generated by the electrical consumer 115, and communicated to control logic module 110, at Step 212. At Step 216, control logic module 110 is then configured to initiate a process (i.e., a programmed algorithm) to determine an optimal power distribution amongst the various electrical energy supplying devices that can supply power to power network 140, based on data provided by VCM 36 and (optionally) other sources, such as an environmental sensing unit (not shown) that produces environmental data related to an environmental state, at Step 220, as will be discussed below. In one embodiment, the provided data may include power limits of the electrical energy supplying devices, vehicle data as discussed above in relation to FIG. 5A, sensor data, environmental data, and other useful data.

Upon determining the optimal power distribution, control logic module 110 is configured to determine the best electrical energy supplying device for controlling the power network 140, at Step 222. Then at Step 230, control logic module 110 is configured to determine whether another electrical energy supplying device other than the one currently in control is better suited to be placed in control of the electrical state of the power network. In the affirmative, control logic module 110 is configured to place the best electrical energy supplying device in control of power network 140, at Step 232. At Step 240, the individual electrical state controllers 120*a*, 124*a*, and/or 126*a* implement the power settings determined in steps 222, 230, and 232. Then, control logic module 110 receives or identifies another power demand, at Step 212. If not, then the electrical state controllers 120*a*, 124*a*, and 126*a* implement the power settings at step 240 as described above.

Referring to the above-discussed determination of power distribution, it is noted that the determination of an optimal power distribution uses data corresponding to power network demand, the state of the energy storage devices 124 and 126, and other available information. In this embodiment, the power network demand can be equal to an output of each energy storage device. The distribution of power among the electrical energy supplying devices is determined by the specific nature of devices 124 and 126.

More specifically, the parameters of interest in regard of energy storage device states include:
1. SOC—An energy storage device with a low SOC can be utilized more heavily during charging mode, whereas an energy storage device with a high SOC may be favored during discharge mode. Also, electrical energy can be moved between energy storage devices so as to move SOC toward preferred states.
2. States of Health (SOH)—Power is shifted preferentially to the energy storage devices that can supply power without being overly damaged or creating a safety/stability problem or causing the devices to age too rapidly.
3. Power Limits—Each energy storage device has a maximum power limit that must be observed. The power limit can depend on the nature of the energy storage device and other available data including temperature, SOC, and others. Moreover, power limits are different for charge and discharge modes.

Other available information can include:
1. Vehicle State—Vehicle state information, including speed, can be used to determine the preferred SOC for energy storage devices. The difference between the actual and preferred SOCs for an energy storage device can be implemented in the determination of power into or out of the device.
2. Predictive Information—Predicted future states can be used to determine power distribution, including:
    a) Data Measured by energy storage devices—Data from the energy storage devices are used to optimize their mutual operation.
    b) Data Obtained from VCM 36—Data received, including, for example, GPS route information, can be used to optimize the power distribution.
    c) Data Obtained from other Sources—Data received from other sources, such as external sensors, or data connection with other units can be used to optimize power distribution.

In selecting the best electrical energy supplying device to control a state of power network 140, the following items can be considered:
1. Aspects of the method—the electrical energy supplying device used for controlling the power network state will be determined by optimizing the device characteristics and specifications against the requirements and considerations:
    a) Optimization—The actual power setting for each device is determined by optimization using all of the requirements and considerations discussed above.
    b) Cost function—A cost function can be implemented to determine a relative importance of each of the preceding requirements and considerations.
    c) Optimization algorithm—an optimization method can be used to maximize the "goodness of it" of the solution against the aforementioned requirements and considerations and/or to minimize operating cost based on against the aforementioned requirements and considerations,
2. Determination of the best electrical energy supplying device to control power network 140 can utilize information relating to the device's characteristics, and capabilities, as well as present and predicted power demand.
3. Determination of the state to be controlled—The primary state to be controlled is either power network voltage or current.
4. Device characteristics—The characteristics of each electrical energy supplying device are considered with respect to the ability of the device to provide control, including:
    a) Type of electrical state controller—Whether the associated electrical state controller is a switch, a DC/DC converter, an alternator/motor/generator, or other unit.
    b) Type of device—Whether the electrical energy supplying device is an energy storage device (battery, capacitor, or similar) or a power generating unit (alternator, motor/generator, or similar)
    c) How the device is controlled—The device to be placed in control as the master controlling unit can be controllable by control logic module 110.

Device Capabilities—The capabilities of the electrical energy supplying device that are to be considered may include:
1. Switch-on time—The time required to turn on may determine whether a device that is switched off can be brought up quickly enough to take on control of the power network state.
2. Device stability—The stability of the device must be considered; the more stable device are more likely to be selected for power network state control.
3. Device State (on/off)—A device that is off, or not providing current, is less likely to be placed in control as it must be brought up first. The latency must be considered as a criterion for device selection.
4. Power Demand/Settings—The present distribution of power can be used as a criterion to select the device to be placed in control of the power network state.
5. Predicted Power Demand/Settings—Predicted power demand and settings are used to determine which device should be placed in control of power network state.
6. Optimization—As previously noted, the device used for controlling the power network state will be determined by optimizing the device characteristics and specifications against the aforementioned requirements and considerations.

As discussed above, a cost function can be utilized to determine the relative importance of each of the preceding requirements and considerations. Also, an optimization method is used to maximize the "goodness of fit" of the selection against the preceding requirements and considerations.

Figure 8:
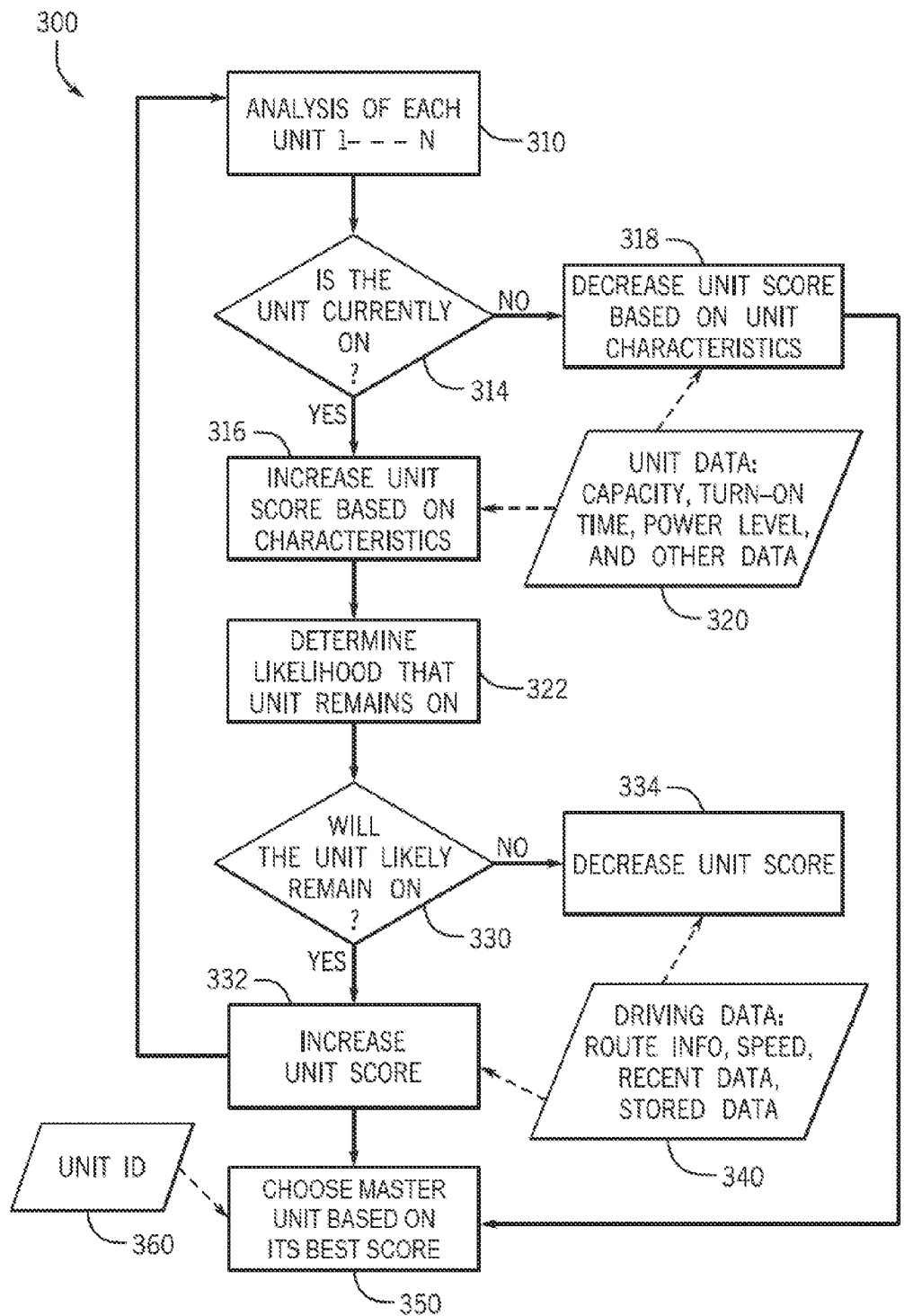
FIG. 8 is a flow chart illustrating an exemplary embodiment of a method for selecting a master controlling unit.

Now referring to FIG. 8, a flow chart shows an exemplary method 300 for selecting an electrical energy supplying device as the master controlling unit. At Step 310, control logic module 110 is configured to initiate an analysis of each of N available units. At Step 314, control logic module 110 is configured to determine whether the unit under consideration is in the "on" state. In the affirmative, control logic module 110 is configured to evaluate a score of that unit and increase it based on its desirable characteristics, at Step 316. At Step 320, particular data about the unit can be made available during the increase of the unit's score. In one embodiment, the unit's data is stored in memory unit 135.

Referring back to FIG. 8, at Step 314, if control logic module 110 determines that the unit under consideration is not turned on, then its score is decreased, at Step 318, at least partly in response to the unit characteristic data provided at Step 320.

After modifying unit score in Step 316 (if reached), control logic module 110 is configured to determine the likelihood that the unit will remain on, at Steps 322 and 330. In the affirmative, control logic module 110 is configured to increase the score of the unit, at Step 332. Otherwise, if control logic module 110 determines that the unit is not likely to remain on, then its score is decreased, at Step 334. As shown in FIG. 8, control logic module 110 utilizes driving data provided at Step 340, in determining the increase in the unit's score and the decrease of the unit's score. The driving data includes route information, vehicle speed, as well as recent and stored data, and/or other sources. After adjusting scores as appropriate in all previous steps, the master controlling unit is determined by control logic module 110 based on the best score, at Step 350, and is identified, at Step 360, based on identification information associated with the selected master controlling unit.

Figure 9:
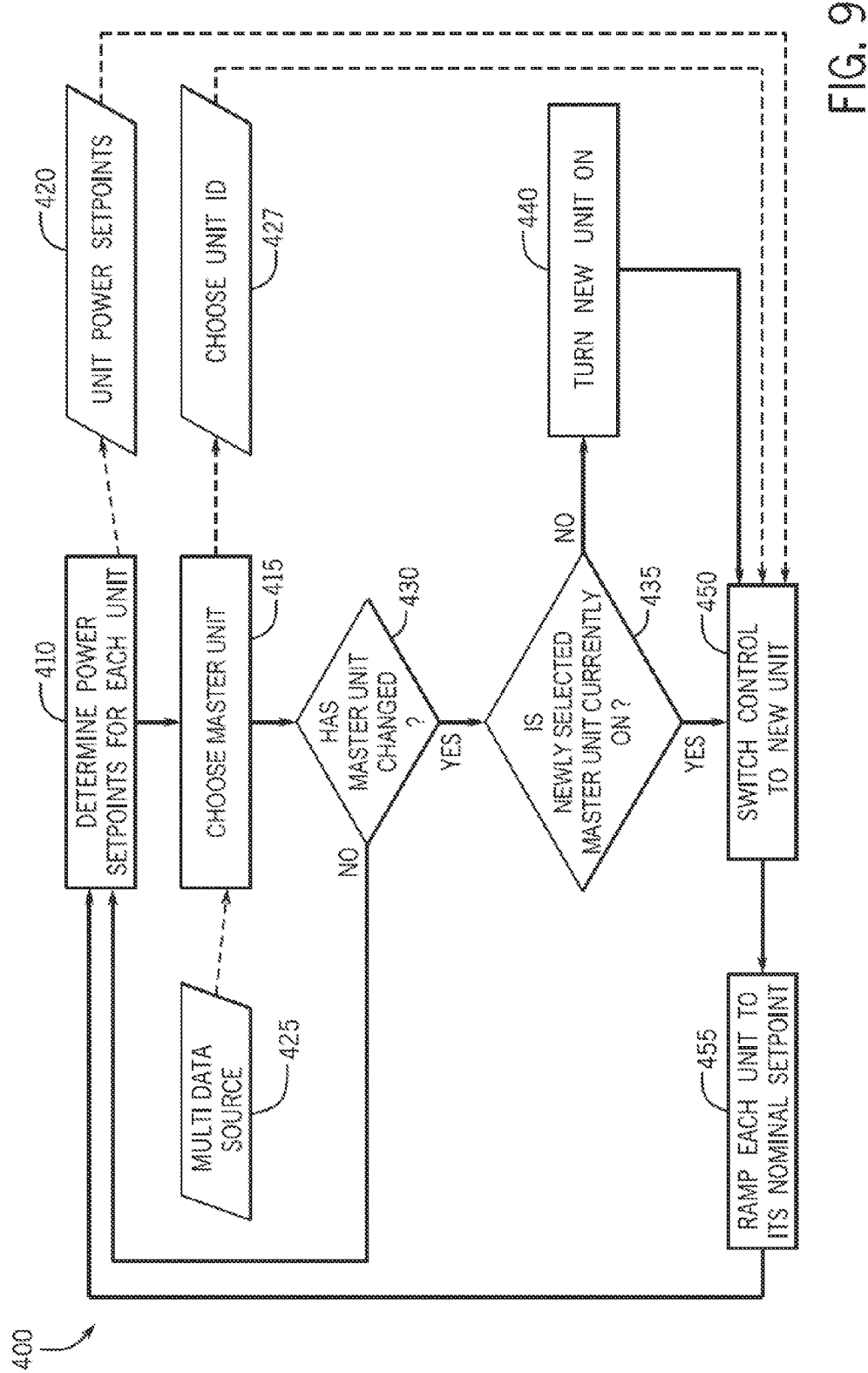
FIG. 9 is a flow chart illustrating an exemplary embodiment of another method for switching control to a selected power state master controlling unit.

Now referring to FIG. 9, a flow chart shows an exemplary method 400 for switching power network control to a new "master" controlling unit selected in accordance with method 300 discussed above. As shown in FIG. 9, control logic module 110 is configured to determine power setpoints for each unit, at Step 410. At Step 415, control logic module 110 selects the master controlling unit that would control power network 140 based on data provided by on a multi-data source, at Step 425.

The power setpoints for each unit that were determined by control logic module 110, at Step 410, may be accessed or retrieved from a power setpoint memory unit, at Step 420. Similarly, the identity of the master controlling unit that is selected by control logic module 110, at Step 415, may be accessed or retrieved from a unit master ID memory unit, at Step 427. In one embodiment, the power setpoint memory unit and the unit master-ID memory unit may be integral or part of memory unit 135 of control logic module 110.

At step 430, control logic module 110 is configured to determine whether the selected master controlling unit is the same as the current master controlling unit function for power network 140. If the selected and current controlling master units are the same, then control logic module 110 is configured to return to determining the power setpoints for each unit, at Step 410. Otherwise, if the newly selected master controlling unit is to replace the master controlling unit, then the control logic module 110 proceeds to determine whether the newly selected master controlling unit is turned on, at Step 435. In the negative, control logic module 110 triggers the turn on of the newly selected master controlling unit, and ramps the new controlling unit to a nominal level of the power setpoint.

If the controlling unit is to remain the same, or after ramping the new controlling unit, the control logic module 110 proceeds to switch the control over the state of power network 140 to the new master controlling unit, at Step 450. The switching process uses the master unit ID information that was retrieved from the unit ID memory unit at Step 427. Thereafter, each unit is ramped to its setpoint, at Step 455. Thereafter, control logic module 110 is configured to return determining again power setpoints for each unit, at Step 410, and method 400 is then repeated.

Figure 10A:
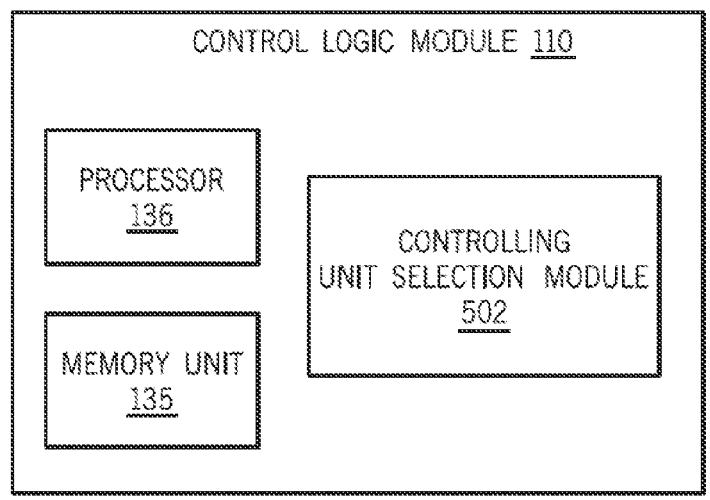
FIG. 10A is a block diagram illustrating an exemplary embodiment of a control logic module.
Figure 10B:
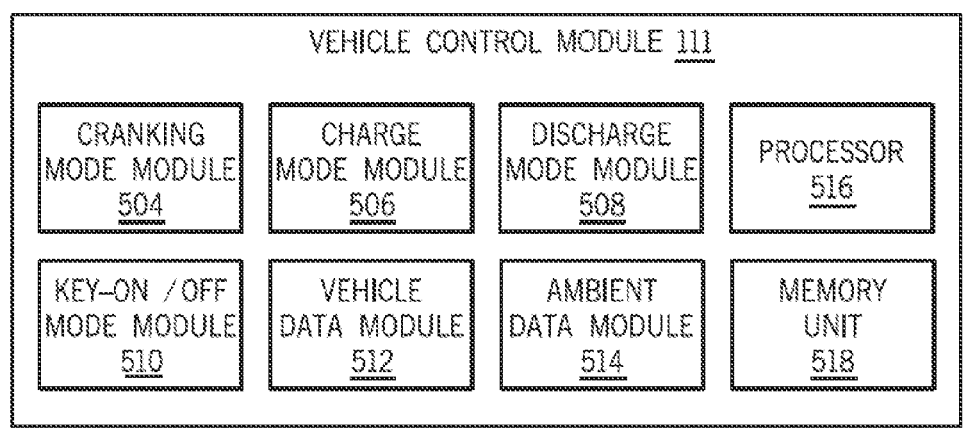
FIG. 10B is a block diagram illustrating an exemplary embodiment of a vehicle control unit.

As shown in FIG. 10A, control logic module 110 includes a master controlling unit selection program (module) 502, a processing unit 136, and a memory unit 135. As shown in FIG. 10B, VCM 36 includes a cranking mode module or program 504, a charge mode module 506, a discharge mode module 508, a key-on/off module 510, a vehicle data module 512, an ambient data module 514, a processing unit 516, and a memory unit 518 coupled to processing unit 516. Alternatively, the above cited programs 502, 504, 506, 508, 510, 512, and 514 may be stored in any desirable or suitable location in vehicle 10, and implemented using any physical instantiation of computation.

Each of processing units 136 and 516 can be implemented on a single-chip, multiple chips or multiple electrical components. For example, various architectures can be used including dedicated or embedded processor or microprocessor (μP), single purpose processor, controller or a microcontroller (μC), digital signal processor (DSP), or any combination thereof. In most cases, each of processing units 136 and 516 together with an operating system operates to execute computer code and produce and use data. Each of memory units 135 and 518 may be of any type of memory now known or later developed including but not limited to volatile memory (such as RAM), non-volatile memory (such as ROM, flash memory, etc.) or any combination thereof, which may store software that can be accessed and executed by processing units 136 and 516, respectively, for example.

Figure 11:
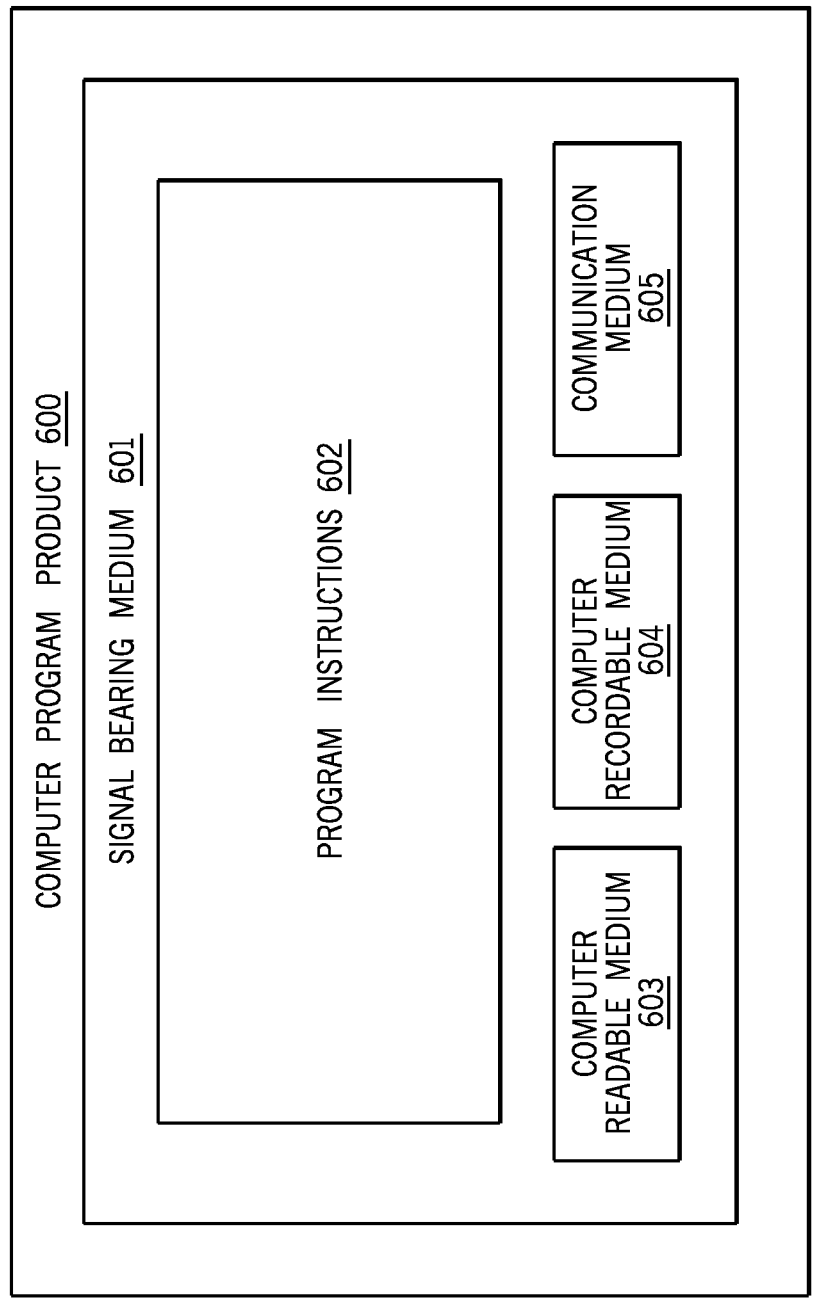
FIG. 11 is a schematic diagram illustrating a conceptual partial view of an example computer program product.

In some embodiments, the disclosed methods may be implemented as computer program instructions encoded on a computer-readable storage medium in a machine-readable format. FIG. 11 is a schematic illustrating a conceptual partial view of an example computer program product 600 that includes a computer program for executing a computer process on a computing device, arranged according to at least some embodiments presented herein. In one embodiment, the example computer program product 600 is provided using a signal bearing medium 601. The signal bearing medium 601 may include one or more programmed instructions 602 that, when executed by a processing unit may provide functionality or portions of the functionality described above with respect to FIGS. 5-9. Thus, for example, referring to the embodiment shown in FIGS. 7, 8, and 9, one or more features of their respective blocks 210-240, 310-360, and 410-455, may be undertaken by one or more instructions associated with the signal bearing medium 601.

In some examples, signal bearing medium 601 may encompass a non-transitory computer-readable medium 603, such as, but not limited to, a hard disk drive, memory, etc. In some implementations, the signal bearing medium 601 may encompass a computer recordable medium 604, such as, but not limited to, memory, read/write (R/W) CDs, R/W DVDs, etc. In some implementations, signal bearing medium 601 may encompass a communications medium 605, such as, but not limited to, a digital and/or an analog communication medium (e.g., a fiber optic cable, a waveguide, a wired communications link such as a controller area network or any suitable vehicle communication bus, etc.).

The logic control, as used herein, includes but is not limited to hardware, firmware, software in execution on a machine/device, and/or combinations of each to perform a function(s) or an action(s), and/or to cause a function or action from another logic control, method, and/or system. Logic control may include a software controlled microprocessor, a discrete logic (e.g., ASIC), an analog circuit, a digital circuit, a programmed logic device, a memory device containing instructions, and so on. Logic control may be implemented using one or more gates, combinations of gates, or other circuit components. Where multiple logic controls are described, it may be possible to incorporate them into one physical logic control. Similarly, where a single logic control is described, it may be possible to distribute it between multiple physical logic controls.

One or more of the disclosed embodiments, alone or in combination, may provide one or more technical effects useful in the fuzzy logic controlling an electrical state of a power network of a vehicle. The technical effects and technical problems in the specification are exemplary and are not limiting. It should be noted that the embodiments described in the specification may have other technical effects and can solve other technical problems.

While only certain features and embodiments of the disclosure have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A power control system for a hybrid electrical vehicle, comprising:
   a power network;
   a power generating unit electrically coupled to the power network by a first electrical state controller, wherein the first electrical state controller is configured to control a first voltage or a first current transmitted from the power generating unit to the power network;
   an energy storage device electrically coupled to the power network by a second electrical state controller, wherein the second electrical state controller is configured to control a second voltage or a second current transmitted from the energy storage device to the power network;
   an electrical load electrically coupled to the power network; and
   control logic configured to:
      identify a power demand from the electrical load;
      calculate a first score for the power generating unit and a second score for the energy storage device based on:
         the power demand; and
         operating characteristics of the power generating unit and the energy storage device including a current on/off state of the power generating unit and the energy storage device and a likelihood that the power generating unit or the energy storage device will remain in the current on/off state; and
      designate one of the power generating unit or the energy storage device to address the power demand by controlling the first and second electrical state controllers respectively, wherein the power generating unit is designated if the first score is higher than the second score and wherein the energy storage device is designated if the second score is higher than the first score.

2. The power control system of claim 1, further comprising one or more sensors for sensing an electrical operating condition of the power network, and wherein the control logic is configured to calculate the first score and the second score based at least in part on the electrical operating condition of the power network.

3. The power control system of claim 1, wherein the electrical load is electrically coupled to the power network by a third electrical state controller configured to control a third voltage or a third current transmitted from the power network to the electrical load.

4. The power control system of claim 1, wherein the energy storage device comprises a battery, a capacitor, or an ultracapacitor.

5. The power control system of claim 1, wherein the first and second electrical state controllers comprise a DC/DC converter, a switch, or an inverter.

6. The power control system of claim 1, wherein the control logic controls a change in the designation by switching a state of the power generating unit, the energy storage device, or a combination thereof between an on-state and an off-state.

7. The power control system of claim 1, comprising a control logic module having the control logic, wherein the control logic module is communicatively coupled to the power generating unit, the first electrical state controller, the energy storage device, the second electrical state controller, and the electrical load.

8. The power control system of claim 1, comprising:
   a first control logic module having the control logic, wherein the first control logic module is communicatively coupled to the first electrical state controller and the power generating unit;
   a second control logic module having the control logic, wherein the second control logic module is communicatively coupled to the second electrical state controller and the energy storage device; and
   a third control logic module having the control logic, wherein the third control logic module is communicatively coupled to the electrical load; and
   wherein the first, second, and third control logic modules are communicatively coupled to one another.

9. The power control system of claim 1, wherein calculating the first score for the power generating unit and the second score for the energy storage device comprises:
   establishing a first base score for the power generating unit and a second base score for the energy storage device;
   increasing or decreasing the first base score based on whether the power generating unit is in an on-state;
   increasing or decreasing the second base score based on whether the energy storage device is in the on-state;
   increasing or decreasing the first base score based on the operating characteristics of the power generating unit;
   increasing or decreasing the second base score based on the operating characteristics of the energy storage device;
   increasing or decreasing the first base score based on a first likelihood that the power generating unit will remain in the on-state;
   increasing or decreasing the second base score based on a second likelihood that the energy storage device will remain in the on-state;
   increasing or decreasing the first base score based on driver data; and
   increasing or decreasing the second base score based on the driver data.

10. The power control system of claim 9, wherein the driver data comprises route information, vehicle speed, or a combination thereof.

11. The power control system of claim 1, wherein the operating characteristics comprise a power state, a stability, a type of device, a state of charge, a state of health, a power limit, a power setting, a predicted power setting, or a combination thereof of the power generating unit, the first electrical state controller, the energy storage device, the second electrical state controller, or a combination thereof.

12. The power control system of claim 1, wherein the control logic is configured to determine the operating characteristics of the power generating unit and the energy storage device.

13. The power control system of claim 1, further comprising a memory unit associated with the control logic and containing data corresponding to operating characteristics of the vehicle, and wherein the control logic is configured to:
predict future operating characteristics of the vehicle based on the data corresponding to operating characteristics of the vehicle; and
calculate the first and second scores based at least upon the predicted future operating characteristics of the vehicle.

14. The power control system of claim 1, wherein the power generating unit comprises a starter, a generator, an alternator, a motor, or a combination thereof.

15. A method, comprising:
identifying a power demand from an electrical load coupled to a power network;
determining a first set of operating characteristics of a power generating unit coupled to the power network by a first electrical state controller, wherein the first electrical state controller is configured to control a first voltage or a first current transmitted from the power generating unit to the power network;
determining a second set of operating characteristics of an energy storage device coupled to the power network by a second electrical state controller, wherein the second electrical state controller is configured to control a second voltage or a second current transmitted from the energy storage device to the power network;
calculating a first score for the power generating unit and a second score for the energy storage device based on:
the power demand;
a current on/off state of the power generating unit and the energy storage device;
a likelihood that the power generating unit or the energy storage device will remain in the current on/off state;
the first and second operating characteristics; and
a current mode of operation of a vehicle having the power network, the power generating unit, the first electrical state controller, the energy storage device, the second electrical state controller, and the electrical load; and
designating one of the power generating unit or the energy storage device to address the power demand by controlling the first and second electrical state controllers respectively, wherein the power generating unit is designated if the first score is higher than the second score and wherein the energy storage device is designated if the second score is higher than the first score.

16. The method of claim 15, wherein addressing the power demand comprises establishing a third voltage or a third current of the power network.

17. The method of claim 15, wherein the first and second sets of operating characteristics comprise a power state, a stability, a type of device, a state of charge, a state of health, a power limit, a power setting, a predicted power setting, or a combination thereof of the power generating unit, the energy storage device, or a combination thereof.

18. The method of claim 15, further comprising determining an environmental state and basing the designation at least in part on the environmental state.

19. The method of claim 15, comprising controlling a switch in the designation by changing a state of the power generating unit, the energy storage device, or a combination thereof between an on-state and an off-state.

20. The method of claim 15, wherein calculating the first score and the second score is based at least in part on a prediction of a change of a mode of operation of the vehicle; historical data of the mode of operation of the system; or a combination thereof.

21. The method of claim 15, wherein calculating the first score for the power generating unit and the second score for the energy storage device comprises:
establishing a first base score for the power generating unit and a second base score for the energy storage device;
increasing or decreasing the first base score based on whether the power generating unit is in an on-state;
increasing or decreasing the second base score based on whether the energy storage device is in the on-state;
increasing or decreasing the first base score based on the first set of operating characteristics;
increasing or decreasing the second base score based on the second set of operating characteristics;
increasing or decreasing the first base score based on a first likelihood that the power generating unit will remain in the on-state;
increasing or decreasing the second base score based on a second likelihood that the energy storage device will remain in the on-state;
increasing or decreasing the first base score based on driver data; and
increasing or decreasing the second base score based on the driver data.

22. The method of claim 15, comprising receiving data corresponding to the historical operating characteristics of the power generating unit, the energy storage device, or a combination thereof and determining the first set of operating characteristics, the second set of operating characteristics, or a combination thereof based at least in part on the historical operating characteristics.

23. A non-transitory computer-readable medium comprising executable code comprising instructions configured to:
identify a power demand from an electrical load coupled to a power network;
determine a first set of operating characteristics of a power generating unit coupled to the power network by a first electrical state controller, wherein the first electrical state controller is configured to control a first voltage or a first current transmitted from the power generating unit to the power network;
determine a second set of operating characteristics of an energy storage device coupled to the power network by a second electrical state controller, wherein the second electrical state controller is configured to control a second voltage or a second current transmitted from the energy storage device to the power network;
calculate a first score for the power generating unit and a second score for the energy storage device based on:
the power demand;
a current on/off state of the power generating unit and the energy storage device;
a likelihood that the power generating unit or the energy storage device will remain in the current on/off state;
the first and second set of operating characteristics; and
a historical mode of operation, a current mode of operation, a future mode of operation, or a combination thereof of a vehicle having the power network, the power generating unit, the first electrical state controller, the energy storage device, the second electrical state controller, and the electrical load; and
designate one of the power generating unit or the energy storage device to address the power demand by controlling the first and second electrical state controllers respectively, wherein the power generating unit is designated if the first score is higher than the second score and wherein the energy storage device is designated if the second score is higher than the first score, and wherein the first and second scores are calculated based on operating costs of transitioning the control of the power network to the power generating unit and the energy storage device respectively.

24. The non-transitory computer-readable medium of claim 23, wherein the first and second sets of operating characteristics comprise a power state, a stability, a type of device, a state of charge, a state of health, a power limit, a power setting, a predicted power setting, or a combination thereof of the power generating unit, the energy storage device, or a combination thereof.

25. The non-transitory computer-readable medium of claim 23, wherein calculating the first score for the power generating unit and the second score for the energy storage device comprises:
    establishing a first base score for the power generating unit and a second base score for the energy storage device;
    increasing or decreasing the first base score based on whether the power generating unit is in an on-state;
    increasing or decreasing the second base score based on whether the energy storage device is in the on-state;
    increasing or decreasing the first base score based on the first set of operating characteristics;
    increasing or decreasing the second base score based on the second set of operating characteristics;
    increasing or decreasing the first base score based on a first likelihood that the power generating unit will remain in the on-state;
    increasing or decreasing the second base score based on a second likelihood that the energy storage device will remain in the on-state;
    increasing or decreasing the first base score based on route information, vehicle data, or a combination thereof; and
    increasing or decreasing the second base score based on the route information, the vehicle data, or the combination thereof.

* * * * *